(12) United States Patent
Lopusnak et al.

(10) Patent No.: US 8,336,505 B2
(45) Date of Patent: Dec. 25, 2012

(54) RING-SHAPED RETRACTABLE PET LEAD

(75) Inventors: Rip J. Lopusnak, Bloomfield, NJ (US); Sascha Prochaska, Bloomfield, NJ (US)

(73) Assignee: The Hartz Mountain Corporation, Secaucus, NJ (US)

( * ) Notice: Subject to any disclaimer, the term of this patent is extended or adjusted under 35 U.S.C. 154(b) by 640 days.

(21) Appl. No.: 12/243,473

(22) Filed: Oct. 1, 2008

(65) Prior Publication Data

US 2009/0217886 A1   Sep. 3, 2009

Related U.S. Application Data

(60) Provisional application No. 61/032,766, filed on Feb. 29, 2008.

(51) Int. Cl.
*B65H 75/34* (2006.01)
(52) U.S. Cl. ......................................................... 119/796
(58) Field of Classification Search .................. 119/769, 119/788, 789, 792, 795–798; *B65G 75/34*
See application file for complete search history.

(56) References Cited

U.S. PATENT DOCUMENTS

| | | | |
|---|---|---|---|
| 2,919,676 A | 1/1960 | Schneider | |
| 3,417,415 A | 12/1968 | Kozak | |
| 3,693,596 A | 9/1972 | Croce et al. | |
| 4,402,472 A | 9/1983 | Burtscher | |
| 4,489,494 A | 12/1984 | Duda | |
| 4,813,625 A | 3/1989 | Takeda | |
| 4,856,726 A | 8/1989 | Kang | |
| D392,429 S | 3/1998 | Plewa et al. | |
| 5,890,456 A | 4/1999 | Tancrede | |
| 6,148,773 A | 11/2000 | Bogdahn | |
| D439,302 S | 3/2001 | Plewa | |
| D448,892 S | 10/2001 | Hans | |
| 6,526,918 B1 | 3/2003 | Arnold | |
| 6,792,893 B1* | 9/2004 | Quintero et al. | 119/796 |
| 6,935,277 B2 | 8/2005 | Vaccari | |
| D519,246 S | 4/2006 | Plewa | |
| 7,131,401 B2 | 11/2006 | Huff et al. | |

(Continued)

FOREIGN PATENT DOCUMENTS

DE             3912069          10/1990

(Continued)

OTHER PUBLICATIONS

English Translation of DE 3912069—see attached.*
Office Action mailed on Apr. 23, 2010, for Canadian Patent Application No. 2,643,904, filed on Nov. 17, 2008.

(Continued)

*Primary Examiner* — Richard Price, Jr.
(74) *Attorney, Agent, or Firm* — Stroock & Stroock & Lavan LLP

(57) ABSTRACT

A comfortable and easy to use retractable pet leash is provided. A retracting and locking leash assembly provides a hollow ring-shaped leash housing, a spool inside the hollow ring-shaped leash housing extending through out the circumference of the hollow ring-shaped leash housing, a retracting mechanism inside the interior of the hollow ring-shaped leash housing, and a brake trigger, the trigger constructed to adopt at least one braking position and one free position. The leash housing, the line opening and the brake trigger are arranged such that when the leash is in use, the user holds the leashing housing as a handle while being able to control the brake trigger with one finger without bearing extra wrist strain from the weight of the leash or the orientation leash.

20 Claims, 3 Drawing Sheets

U.S. PATENT DOCUMENTS

| | | |
|---|---|---|
| 7,168,393 B2 | 1/2007 | Bogdahn et al. |
| 2003/0042350 A1 | 3/2003 | Irving |
| 2003/0145803 A1 | 8/2003 | Muller |
| 2006/0118062 A1 | 6/2006 | Edwards |
| 2006/0266300 A1 | 11/2006 | Perkitny |
| 2007/0022975 A1 | 2/2007 | Arnold |
| 2007/0131177 A1* | 6/2007 | Perkitny .................. 119/796 |
| 2008/0011895 A1 | 1/2008 | Bleshoy |

FOREIGN PATENT DOCUMENTS

| | | |
|---|---|---|
| DE | 9112682 | 3/1993 |
| EP | 0320079 | 5/1983 |
| EP | 0093445 | 6/1989 |
| EP | 0464725 | 1/1992 |
| EP | 0970606 | 1/2000 |
| WO | WO 03/007703 | 1/2003 |
| WO | WO 2005/025303 | 3/2005 |

OTHER PUBLICATIONS

Internet Product Description of Retractable Leash from www.fetchdog.com.
Internet Product Description of Zip Lead Retractable Leash from www.walkbuddygear.com.
Internet Product List for "Retractable Leash" from www.google.com.
Internet Brochure for Retractable Leashes from www.flexiusa.com.
Internet Product Description of Retractable Lead in Color Black from www.amazon.com.
Internet Article "What is a Retractable Leash?" from www.wisegeek.com.
Internet Article "Retractable Dog Leash" from www.petstreetmall.com.
International Search Report in App. No. PCT/US 09/35701 dated Apr. 30, 2009.

* cited by examiner

RING-SHAPED RETRACTABLE PET LEAD

This application claims the benefit of provisional application Ser. No. 61/032,766, filed Feb. 29, 2008, the contents of which are incorporated herein by reference.

BACKGROUND OF INVENTION

This invention relates generally to a leash or lead for handling domestic animals, such as one suitable to use on house pets such as dogs.

Various retractable leashes for a pet owner to control the pet while walking the pet are well-known in the art. Numerous variations exist to account for different purposes. However, there is an unsolved need for a design that is more convenient to use, places less strain on the user's hand and affords greater control over the animal.

Typically, a retractable lead contains a reel around which the strap or cord may wind or unwind, a housing to store the reel and the wound lead, a mechanism for controlling the release and retracting of the lead, and a handle allowing the pet owner to hold the entire assembly. The majority of retractable leashes in the marketplace features a retractable coiling system stored in a housing and a handle extending from the housing. An example of a retracting and locking leash assembly is seen in U.S. Pat. No. 7,131,401 the contents of which are incorporated by reference. U.S. Pat. No. 7,131,401 describes a housing for containing the reel and the retracted leash and an attached handle. When held in hand, the weight of the unit is concentrated towards the leash end of the handle. The weight of the leash housing puts extra strain on the hand and wrist of the user, unless pointed downwards. Also, the handle provides few options for gripping.

Alternatively, the leash may be wound around a hollow ring and encased in a housing with an semi-circle opening at its center whereby the user's hand grips around the retractable mechanism, as shown in German Patent DE 3912069. Although the weight of the leash is on the user/proximal end and not at the leash end, the design can create discomfort due to the configuration of the finger opening, the bulky mechanism, and the fixed orientation of the hand vis-à-vis the direction of the leash which can place undesired torque on the user's hand when even a small dog pulls hard. Also, the brake mechanism does not appear to be fully disclosed so as to be replicated.

Therefore, it is desirable to provide an improved retractable pet leash that offers greater comfort, convenience and easy of control the pet.

SUMMARY OF THE INVENTION

Generally speaking, in accordance with the invention, a comfortable and easy to use retractable pet leash or lead assembly is provided with a hollow ring-shaped leash housing to store the retracted leash. The lead can be a strap, cord, tape or line and is stored on a retractable reel assembly. The same leash housing also operates as a handle. By combining the functionality of the leashing housing with the leash handle, the center of gravity of the leash assembly is closer to the user's hand and imposes less strain than conventional retractable leash with a separate handle component. The handle is arranged away from the opening for the leash line, allowing the leash to extract or retract in the direction of the pet animal when the user holds the handle without adding wrist strain or torque.

A brake trigger/button can be provided on the surface of the ring. The trigger controls a braking mechanism. In one embodiment of the invention, when the brake trigger is disposed to the braking configuration, a flipper lock, which can be spring-loaded, is urged into contact and exerts pressure on the reel or line and prevents the line from further extraction (by the animal) or retraction (by the retracting mechanism). When the brake trigger is disposed to the free configuration, the flipper lock moves away from the line, thereby permitting the line to move freely, either off or onto the reel.

A region of the hollow-ring-shaped leash housing away from the line opening and the retracting mechanism is constructed to be a handle. When in use, a user holds the handle portion of the ring and can control the extraction and retraction of the leash via a brake trigger positioned near the user's fingers (including thumb), thereby permitting an user to operate the leash with a single hand. In an embodiment of the invention, the opening is large enough to slip over a user's arm and fit in the crook of their elbow.

Thus, it is an advantage of the invention to provide a retractable lead assembly with an improved weight balance that is less tiring on the wrist and fingers and easier to maneuver.

It is an additional advantage of the invention to provide a retractable lead assembly that is easy and comfortable to hold.

Other objects and features of the present invention will become apparent from the following detailed description, considered in conjunction with the accompanying drawing figures. It is to be understood, however, that the drawings are designed solely for the purpose of illustration and not as a definition of the limits of the invention.

BRIEF DESCRIPTION OF THE FIGURES

For a fuller understanding of the invention, reference is had to the following description, taken in connection with the accompanying drawings, in which.

DETAILED DESCRIPTION OF THE INVENTION

In accordance with an embodiment of the invention, a retracting and locking leash assembly is provided with a hollow ring-shaped leash housing, a spool inside the hollow ring-shaped leash housing extending through out the circumference of the hollow ring-shaped leash housing, a length of line (or a strap or another lead material) having an inner end attached to the spool within the interior of the hollow ring-shaped leash housing. The line has an outer end that extends from a line opening through the hollow ring-shaped leash housing. The outer end of the line can be attached to a fastener outside the hollow ring-shaped leash housing, a retracting mechanism inside the interior of the hollow ring-shaped leash housing, the retracting mechanism constructed to exert a force of retracting the length of the line into the hollow ring-shaped leash housing around the spool and a brake trigger, the trigger constructed to adopt at least one braking position and one free position.

The components of a retractable leash assembly in accordance with preferred embodiments of the invention can be manufactured via known methods of plastic molding and manufacture, the details of which will be apparent to those having skill in the art. The precise shapes and sizes of the components described herein or the specific types of materials used to make the components of the invention are not necessarily essential to the invention. The invention is described with reference to illustrative embodiments.

Figure 1:
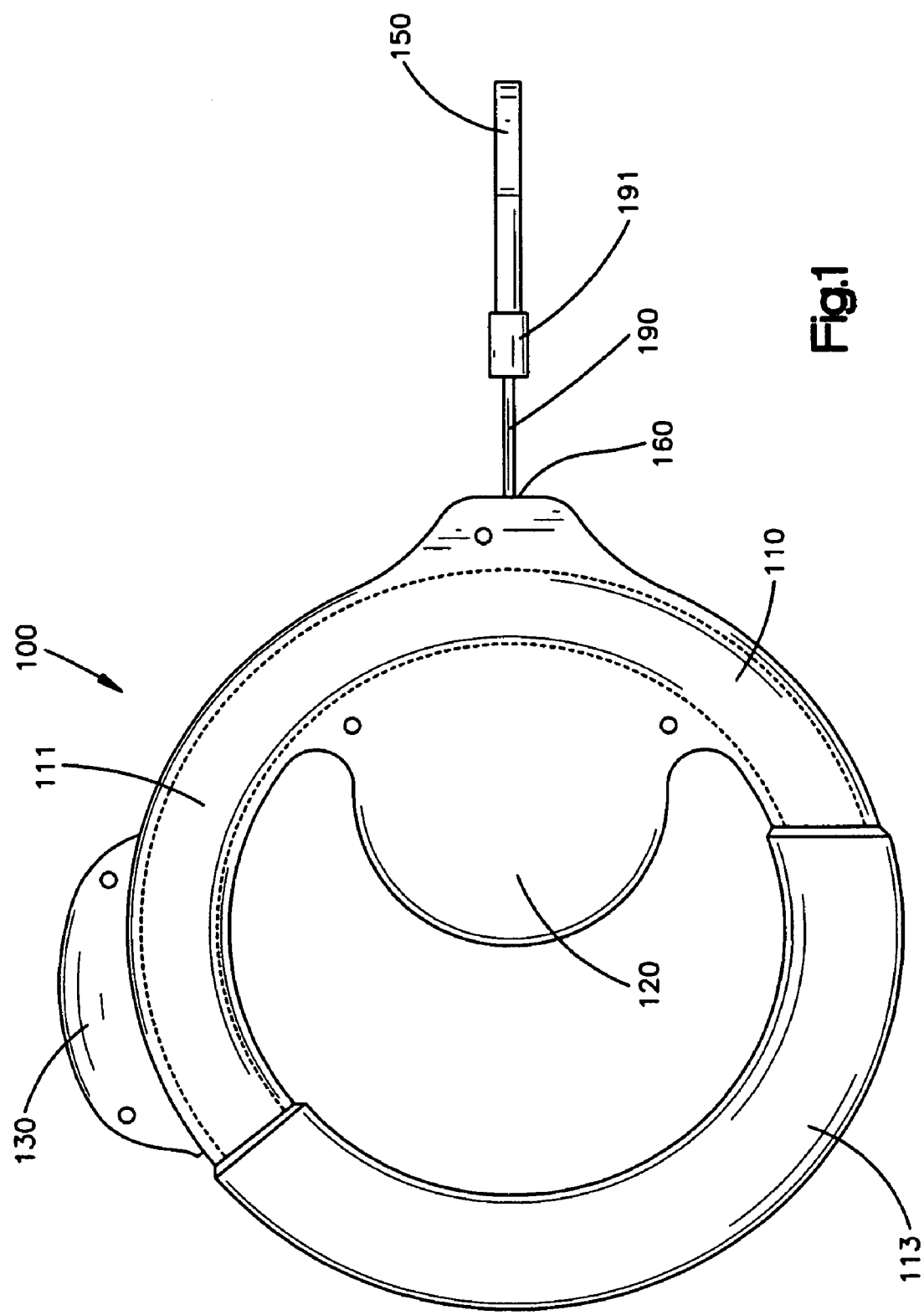
FIG. 1 is side plane view of a leash assembly in accordance with an embodiment of the invention.

A non-limiting example of a retractable leash assembly constructed in accordance with preferred embodiments of the invention is generally shown as retractable leash system 100 in FIG. 1. Retractable leash system 100 includes a hollow ring-shaped leash housing 110 having a leash opening 160 through the surface of the outer circumference of leash housing 110. A handle portion 113 is located along a span of arc of leash housing 110 distal from opening 160. A gear housing 120 is coupled to be positioned at the inner circumference of leash housing 110 and can be near opening 160. A brake switch 130 is positioned on the outer circumference of leash housing 110 along a span of arc of leash housing 110 next to handle portion 113.

Leash housing 110 has a hollow inner space 111 to accommodate a spool for holding a substantial length of a line 190 when line 190 is retracted within housing 110. One inner end of line 190 is attached to the spool within the interior of hollow ring-shaped leash housing 110. An outside end 191 extends from opening 160. Outside end of line 190 is attached to a fastener 150, preferably by a pivoting clasp such as a garabiner clasp. Line 190 may be made up of any material and having a profile that is consistent with usage, other than what is depicted in FIG. 1. Leash line in accordance with the invention can be made from any material sufficiently flexible and sturdy to withstand normal wear and tear consistent with a retractable leash (such as withstanding frequent pulling by the gears and the animal or biting or clawing of the animal) and will be apparent to those having skill in the art. A preferred material for the leash line is Nylon webbing. It can have a round cross-section or a flat strap cross-section. In one embodiment of the invention it is 8-20 feet, preferably 12-18 feet preferably with a flat tape shape. It is light reflecting for nighttime safety. Housing 110 can be made with light reflecting or glow-in-the-dark material.

Leash housing 110 has a diameter sufficiently small to hold and manipulate, while the central ring opening has a diameter sufficiently large to accommodate the user's fingers as they wrap around handle portion 113. In one embodiment of the invention, the diameter of a leash housing (as measured from the a point on the outer circumference of the leash housing ring that is not elevated or depressed due to the flip switch or the line opening) is in the range of 4 to 6 inches, and preferably in the range of 4.5 to 5.5 inches. The diameter of the ring opening in the center of a leash housing (as measured from a point on the inner circumference of the leash housing ring that is not elevated or depressed due to the gear housing) is in the range of 2.5 to 5.0 inches and preferably in the range of 4.0 to 3.25 inches.

Gear housing 120 is preferably fitted with a coil spring and a gear mechanism. The gear should be capable of meshing and turning a corresponding set of internal gears connected with the spool. Alternatively, a friction, based roller system can be used. The coil spring exerts a constant force to turn the gear in a direction that draws line 190 into leash housing 110. When line 190 is fastened to the animal and flip switch 130 is in an unlocked position, the animal can exert a force to overcome the force of the spring to draw line 190 out of leash housing 110.

Opening 160 may be formed directly through leash housing 110. Alternatively, opening 160 may be formed with another piece of material and is later inserted into the leash housing. The opening may adopt a shape corresponding to the cross-section (e.g., round or flat) of line 190 to ensure the smooth retraction and extension of line 190 and reduce unintentional folding or tangling of the line.

Handle portion 113 is designed to be held by the user when the leash is in use. Therefore, it can be designed with features that aid grappling and manipulation of the leash system. Handle portion 113 may have surface texture to increase friction for holding the leash or may adopt curvature to promote fitness with the fingers and hand of the user. In one preferred embodiment of the invention, handle portion 113 is fitted with a cover to provide a surface that is comfortable and non-slipping. Appropriate cover material may include natural or synthetic rubber or rubber-like material such as 80 Durometer Solid Neoprene Rubber.

Opening 160 permits a line 190 to retract into or to extend out of leash housing 110. Opening 160 and Handle portion 113 are relatively positioned so that when a user wraps their fingers around handle portion 113 during use without bending their wrist, the opening is directed away from the user. This way, as the animal pulls line 190, the user's hands can be in line with the direction of pulling. Also, the user can shift their grip position forward, to be generally over gear housing 120 when the animal is not pulling, to balance housing 110 in the most comfortable position.

Flip switch 130 is preferably a single push button switch constructed to engage in a locking position and in a release position. When disposed to the release position, line 190 may be drawn into or pulled out of leash housing 110 by the force exerted by the retraction mechanism or the animal, respectively. When flip switch 130 is disposed to the lock position, a lock can come into contact with line 190 and push line 190 against the reel, thereby inhibiting the extraction or the retraction of line 190. Alternatively, a lock can engage the spool directly.

Figure 2:
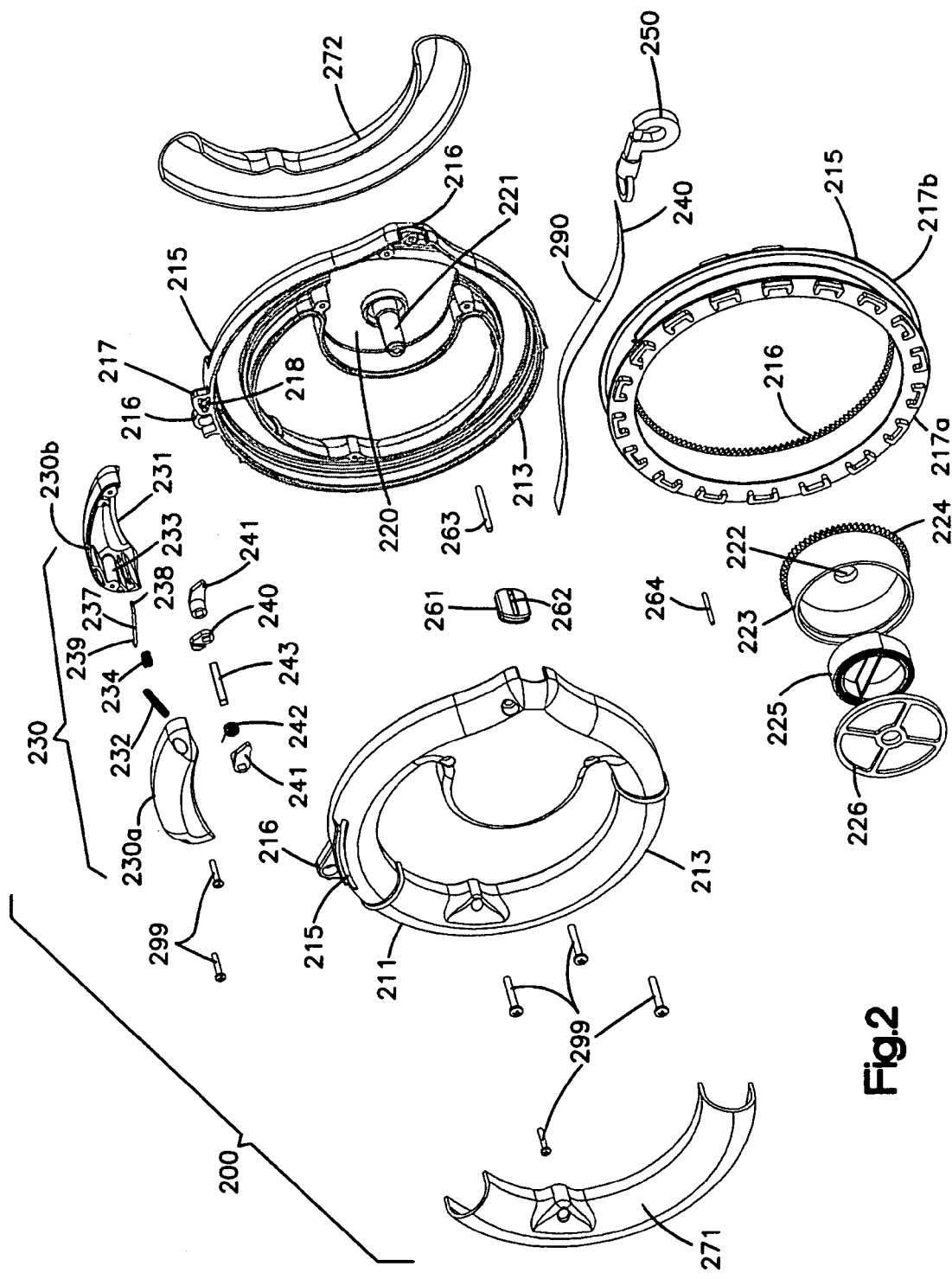
FIG. 2 is exploded perspective view of a leash housing in accordance with an embodiment of the invention.

FIG. 2 is an exploded view of a leash retraction device 200 in accordance with an embodiment of the invention. Retraction device 200 includes a pair of leash housing halves 211 and 212. A handle portion 213 of device 200 is fitted with a pair of rubber or rubber-like soft grip halves 271 and 272. A gear housing 220 is formed integral with leash housing halves 211 and 212 and defines a generally cylindrical space having a spring axle 221. A spur gear 223 has an external gear rim 224 and a central opening 222 that fits over axle 221 inside gear housing 220. A coil spring 225 is fitted inside spur gear 223 and a coil spring cover 226 fits with spur gear 223 and retains coil spring 225 inside spur gear 223. Coil spring 225 is elastically deformed when spur gear 223 rotates around the axle and exerts recoil torque, restoring spur gear 223 to its original orientation. The entire retraction device 200 is assembled together by six screws 299.

A webbing guide 261 fits into an opening 216 on the leash housing. A webbing guide opening 262 on webbing guide 261 is shaped to match the cross section of line 290, thereby helping line 290 to retract or extend without knot or tangle. Pins 263 and 264 are positioned inside leash housing behind opening 216 to assist with smooth extraction or retraction of line 290.

A spool 215 fits inside the main ring portion of leash housing 211 and 212. Spool or reel 215 for storing line 290 rides inside the annular channel defined by leash housing halves 211 and 212. Reel 215 has a pair of raised sides 217a and 217b to help retain line 290 as it is being drawn in or out. One end of line 290 is attached to reel 215. The other end of line 290 is attached to a clasp 250 designed to attach to the animal. An internal gear 216 is present along the inner circumference of reel 215. When reel 215 and spur gear 223 are assembled into leash housing 211 and 212, internal gear 216 of reel 215 meshes with external gear 224 and couples the rotation of spur gear 223 with the rotation of reel 215.

The two halves 230a and 230b of a flip switch button 230 are positioned along the outer circumference of assembly 200 near handle portion 213. A rail 231 on each half 230a and 230b of button 230 can engage corresponding grooves 215 on the leash housing. When two halves 230a and 230b of switch button 230 are fasted together, rails 231 are inserted into grooves 215, thereby permitting switch button 230 to slide along the leash housing.

Flip switch button 230 controls the braking of the leash via a flipper lock 241. In the free position, flipper lock 241 is generally positioned horizontally without touching the line on reel 215. Flipper lock 241 and a flipper catch 240 are held on a square shaft 243 and maintained in their orientation by a torsion spring 242. The assembly of flipper catch 240, flipper lock 241, torsion spring 242, and square shaft 243 is held between two flipper anchors 216 on leash housing 211 and 212.

A flipper lock bent rod 237 is connected to flip switch button 230 on a first end 238, and engages a trapezoidal track 217 on leash housing 212 on a second end 239 to create a mechanical linkage. A spring 234 maintains tension on rod 237. The two ends 238, 239 of bent rod 237 are perpendicular to the length of the rod and point in the same parallel direction. Trapezoidal track 217 contains a cam surface 218 tracing the outline of sideways V, permitting end 239 of flipper lock bent rod 237 to move along the groove as flipper switch button 230 is moved to engage or release the braking mechanism.

To actuate the braking mechanism, switch button 230 is urged forward along the leash housing. A bump 233 in switch button 230 pushes against the top of flipper catch 240 and rotates flipper catch 240, which in turn rotates flipper lock 241 into a vertical direction whereby the tip of flipper lock 241 is lowered into the interior of reel 215 and presses against line 290. Sliding switch button 230 compresses flipper switch button spring 232. As switch button 230 moves into the locked position, it urges flipper lock bent rod 237 in a direction to shift end 239 of flipper lock bent rod 237 from the tip of cam surface 218 until end 239 stops halfway around the cam surface. As a user releases switch button 230, flipper switch bent rod 239 remains in the engaged location in cam surface 218. When the entire flip switch assembly is held in the activated position, the position of bump 233 and the tension from torsion spring 242 maintains the vertical position of flipper lock 241, whereby flipper 241 presses against line 290 to stop the extraction and retraction of line 290.

To release the braking mechanism, switch button 230 is urged forward along the leash housing and moves flip switch bent rod 239 around cam surface 218 to the initial position and flipper switch button spring 232 moves switch button 230 back to the initial position. Torsion spring 242 returns flipper lock 241 to the horizontal position away from leash 290.

Thus, the retracting mechanism allows the user to either lock the line in place or to release the line and allow it to retract into the ring or to be further pulled out by the leashed animal. Both operations are accomplished by a single push on the same button.

The springs used in the flipper switch brake and the retractable mechanism in accordance with the invention can be made from any material suitable for a spring and will be apparent to those having skill in the art. A preferred material for the springs is steel.

Figure 3:
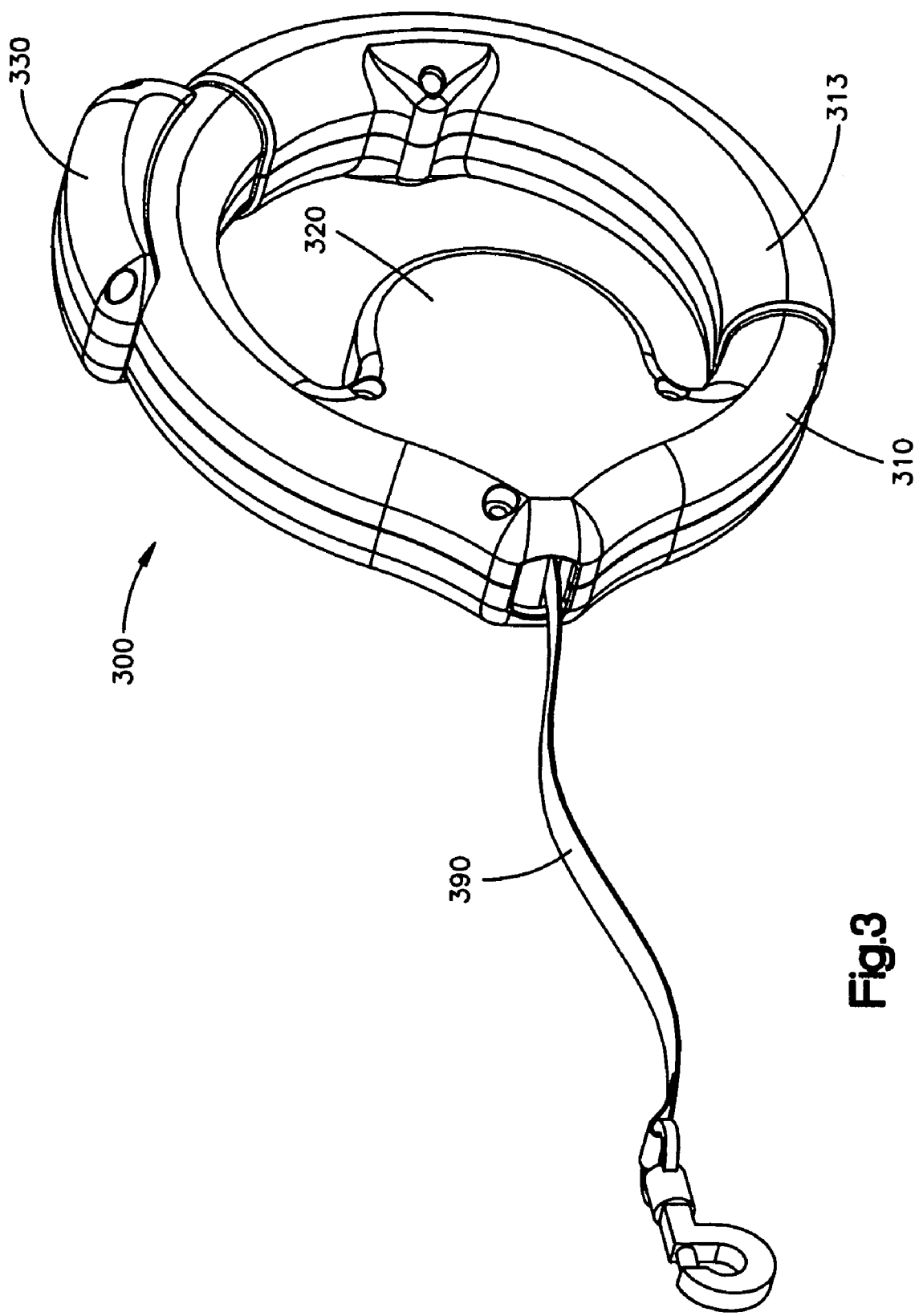
FIG. 3 is a perspective view of a leash assembly in accordance with an embodiment of the invention.

FIG. 3 is a perspective view of a leash assembly 300 in accordance with the invention. A switch button 330, a gear housing 320, and a line opening 360 are arranged around leash housing 310 such that when a user holds the leash assembly by a handle region 313, the user's finger can operate switch button 330, and gear housing 320 and line opening 360 are positioned on the portion of leash housing 310 away from handle region 313 and dispenses leash 390 in a direction parallel to the user's arm without tilting the user's wrist.

While there have been shown, described and pointed out novel features of the present invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

It is also to be understood that the following claims are intended to cover all of the generic and specific features of the invention herein described and all statements of the scope of the invention which, as a matter of language, might be said to fall therebetween.

What is claimed is:

1. A retracting and locking leash assembly, comprising:
   a hollow ring-shaped leash housing with a lumen therethrough, defining a substantially open space at the center of the ring;
   a spool inside the lumen of the hollow ring-shaped leash housing extending throughout the circumference of the hollow ring-shaped leash housing;
   a length of line around the spool having one end attached to the spool within the lumen of the hollow ring-shaped leash housing and extending from a line opening on the surface of the hollow ring-shaped leash housing and a second end outside the hollow ring-shaped leash housing;
   a retracting mechanism inside the interior of the hollow ring-shaped leash housing, the retracting mechanism constructed to exert a force of retracting the length of the line into the hollow ring-shaped leash housing around the spool; and
   a brake trigger accessible by the user, the trigger constructed to adopt at least one braking position and one free position; and
   a portion of the hollow-ring-shaped leash housing opposite to the location of the line opening and the retracting mechanism is constructed in a configuration to function as a handle with the spool travelling through the handle, the line opening being substantially perpendicular to the handle.

2. The leash assembly of claim 1, wherein the ring-shaped leash housing has a circumference between 4 to 6 inches.

3. The leash assembly of claim 1, wherein the ring-shaped leash housing has a circumference between 2.5 to 5 inches.

4. The leash assembly of claim 1, wherein the brake trigger comprises of a single switch positioned near user's fingers when the user holds the handle.

5. The leash assembly of claim 1, wherein the brake trigger in the braking position urges a lock to impede the release or retraction of the line.

6. The leash assembly of claim 1, wherein the ring-shaped housing is generally circular.

7. The leash assembly of claim 1, wherein the portion of the leash housing constructed to be a handle is covered by natural or synthetic rubber.

8. The leash assembly of claim 1, wherein the retraction mechanism includes a coil spring and a gear coupled to the coil spring and the spool.

9. The leash assembly of claim 1, wherein the substantially open space in the center of the ring-shaped leash housing is large enough to accommodate the user's fingers as they wrap around the handle.

10. The leash assembly of claim 1, wherein the substantially open space in the center of the ring-shaped leash housing is large enough to accommodate a human arm.

11. The leash assembly of claim 1, wherein the diameter of the opening in the center of the ring-shaped leash housing, as measured from a point on the inner circumference of the ring-shaped leash housing that is not elevated or depressed due to the retraction mechanism, is 2.5 to 5.0 inches.

12. The leash assembly of claim 1, wherein the diameter of the opening in the center of the ring-shaped leash housing, as measured from a point on the inner circumference of the ring-shaped leash housing that is not elevated or depressed due to the retraction mechanism, is 4.0 to 3.25 inches.

13. A retractable line assembly, constructed and arranged to be suitable for use as a pet lead, comprising:
   a housing, defining a generally annular shape, with an annular lumen therein, the housing having an annular inner external surface defining a substantially open space;
   a reel and a lead wrapped around the reel within the housing, the lead extending through the lumen and emerging from the housing at an opening in the housing;
   a retraction mechanism on the housing located in the substantially open internal space and engaged with the reel to apply a winding force to urge the reel to rotate in a direction to wind the lead onto the reel, but also constructed to unwind when sufficient force is exerted on the lead to overcome the winding force;
   the housing having a gripping portion at a location on the housing opposite the opening, with the spool travelling therethrough, the substantially open space large enough for a user to hold the housing by holding the annular portion, but not the retraction mechanism, wherein the opening is substantially perpendicular to the gripping portion.

14. The assembly of claim 13, including a stop button located on the housing and disposable in an open position and a locked position and a lock mechanism coupled to the stop button, the button and lock mechanism constructed and arranged so that when the button is urged from the open position to the locked position, it applies a force to stop the lead from being unwound from the reel.

15. The assembly of claim 13, wherein the retraction mechanism includes a coil spring and a gear coupled to the coil spring and the reel.

16. The assembly of claim 13, wherein the retraction mechanism is located near a location on the housing from where the lead extends and the inner annular opening is positioned so that a user can hold the housing at a position directly proximal from the retraction mechanism.

17. The leash assembly of claim 13, wherein the substantially open space in the center of the ring-shaped leash housing is large enough to accommodate the user's fingers as they wrap around the handle.

18. The leash assembly of claim 13, wherein the substantially open space in the center of the ring-shaped leash housing is large enough to accommodate a human arm.

19. The leash assembly of claim 13, wherein the diameter of the opening in the center of the ring-shaped leash housing, as measured from a point on the inner circumference of the ring-shaped leash housing that is not elevated or depressed due to the retraction mechanism, is 2.5 to 5.0 inches.

20. The leash assembly of claim 13, wherein the diameter of the opening in the center of the ring-shaped leash housing, as measured from a point on the inner circumference of the ring-shaped leash housing that is not elevated or depressed due to the retraction mechanism, is 4.0 to 3.25 inches.

* * * * *